April 16, 1946. J. L. HILLMAN 2,398,376
FLUID SEALING DEVICE FOR SHAFTS AND THE LIKE
Filed May 15, 1944
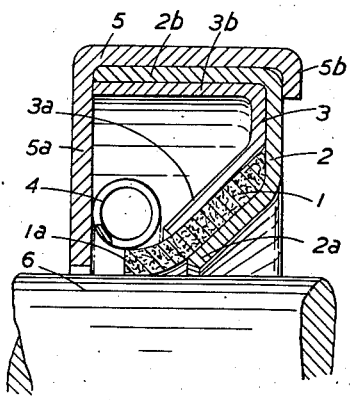
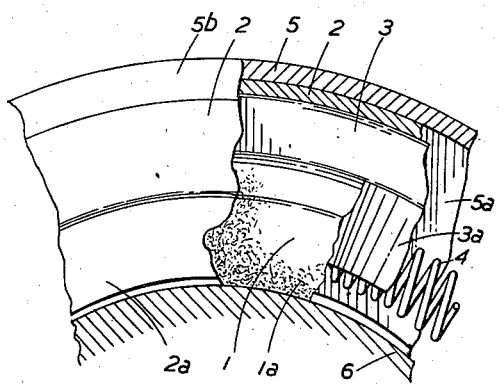
Joseph L. Hillman Inventor
By
Attorney Patented Apr. 16, 1946

2,398,376

UNITED STATES PATENT OFFICE 2,398,376

FLUID SEALING DEVICE FOR SHAFTS AND THE LIKE

Joseph Leonard Hillman, Dudley, England

Application May 15, 1944, Serial No. 535,707
In Great Britain November 10, 1943

2 Claims. (Cl. 288—3)

This invention relates to fluid sealing devices of the kind for retaining lubricant in and preventing ingress of foreign matter to housings surrounding shafts or reciprocating rods.

One main object of the present invention is to provide a construction of fluid seal in which the sealing element is so constructed and mounted that the original shape of the sealing element is retained when in use and thereby efficient sealing obtained. A fluid sealing device constructed according to the present invention comprises in combination two nesting rings, each having a conical seating formed thereon, a sealing element in the form of a normally conical band clamped between said conical seatings with a marginal portion of the band projecting from said seatings to form a sealing lip, said seatings having the same angle of conicity as the band so that they give continuous support to the band, except for the lip, and thereby maintain the band in its normal conical shape over the whole of its width, except for the lip, the angle of conicity of said seatings and band being such as to present the band at the desired angle to the machine member on which the lip forms a seal.

An internal seal for shafting and the like constructed according to the present invention comprises a sealing element in the form of a conical band of which the inner marginal portion forms a sealing lip, the sealing band being clamped between two nesting rings each comprising at the inner edge a conical seating for the band, from which seatings the sealing lip projects, the two rings being turned over at their outer edges to form two closely fitting concentric flanges, of which the outer flange snugly fits into an annular casing including an inward wall against which the edges of the flanges abut when the rings are secured within the casing, the inner edge of the inward wall surrounding the sealing lip.

An advantage arising out of constructions according to the present invention is the considerable economy in the amount of material used in forming the sealing lip as compared with fluid sealing devices in which the sealing lip is formed on a radial sealing element or on an axially directed flange to a sealing washer which itself is radial to the shafting sealed by the sealing element.

Moreover the sealing element being in the form of a normally conical band which, except for the operating edge, is wholly supported, the original conical shape of the element is retained during use and there can be no deformation in any part of the element which tends to generate forces opposing the flexing of the lip when a shaft or the like is passed through the seal.

In order that the invention may be more clearly understood one embodiment will now be described by way of example with reference to the accompanying drawing in which:

Figure 1 is a sectional view of an internal oil seal for use on rotary shafts, and Figure 2 is an elevation from the right hand side of Figure 1, with parts broken away to show the construction behind them.

In the drawing like references indicate the same or similar parts.

In the construction shown in Figures 1 and 2 the sealing element is a rubber band 1 of normally conical form and of rectangular cross section. This sealing band 1 is disposed on a conical flange 2a forming the inner wall of a channel ring 2, the conical flange giving continuous support to the sealing band from its outer edge inwardly, leaving the inner marginal portion 1a, which constitutes the sealing lip, projecting inwardly of the conical flange. Into this assembly is placed a second channel ring 3 which comprises an inner conical flange 3a, which is parallel to the flange 2a of the outer ring, and when the inner channel ring 3 is pressed into the outer channel ring 2 the sealing band 1 is clamped between the two conical flanges 2a and 3a, the sealing lip 1a projecting as a continuous flexible flap from these juxtaposed conical flanges. The channel members 2 and 3 are so constructed that when they are assembled together the edges of their outer walls 2b and 3b lie in the same transverse plane.

Where the sealing band 1 is made of leather the sealing lip 1a is encircled by a garter spring 4, and to complete the sealing device a casing ring 5 of L shape cross section is applied to the nested channel rings and sealing band. However, a garter spring may be employed in all constructions according to the invention irrespective of the material from which the sealing element is made.

In applying the casing the inwardly directed wall 5a, of the casing 5, which lies in a plane to which the axis of a shaft 6 passing through the device is normal, bears on the garter spring 4 and presses it slightly inwardly along the sealing lip 1a, thereby placing the garter spring in tension and producing a conserved energy always available to press the sealing lip towards the shaft 6 which it encircles.

The cylindrical wall of the casing 5 is slightly wider than the wall of the outer channel ring and to secure the rings within the casing the free edge of the wall of the casing is turned over the radial face of the outer ring 2 as shown at 5b, and thereby the oil seal is completed, the sealing lip 1a is so clamped that its cross sectional shape is not altered except for the flexing of the lip, and this deformation is obtained without deforming other parts of the sealing element in which would be built up a force tending to act against the desired flexing of the lip.

The sealing element 1 may be moulded of synthetic rubber or other plastic material, as is well understood in the art, and either an embracing garter spring may be employed or the sealing element may have incorporated therein a spring ring so formed as to resist the flexing of the lip when a shaft is disposed in the oil seal.

By the present invention a considerable economy in the consumption of material for manufacturing the sealing element is obtained, since it is only necessary to have a cross sectional area sufficient to provide beyond the sealing lip, only so much band material as is required to clamp it securely in operative position, and it will be observed that except for the flexing of the sealing lip the rectangular cross section of the sealing band is maintained.

I claim:

1. A fluid sealing device for preventing the escape of lubricant from, or the ingress of foreign matter to, an annular space between two relatively moving machine members, comprising in combination two nesting rings, each having at the inner edge a conical seating, a sealing element in the form of a conical band of which the inner marginal portion forms a sealing lip, said band being clamped between said conical seatings with its sealing lip projecting therefrom, an external annular casing having an inwardly directed wall, and a flange at the outer periphery of each ring, said flanges closely fitting together within the annular casing with their edges abutting the inward wall thereof, and the inner edge of said inward wall surrounding the sealing lip.

2. A fluid sealing device for preventing the escape of lubricant from, or the ingress of foreign matter to, an annular space between two relatively moving machine members, comprising in combination two nesting rings, each having at the inner edge a conical seating, a sealing element in the form of a conical band of which the inner marginal portion forms a sealing lip, said band being clamped between said conical seatings with its sealing lip projecting therefrom, a garter spring disposed about the sealing lip, an external annular casing having an inwardly directed wall bearing laterally on the garter spring to press it slightly inwardly along the sealing lip, and a flange at the outer periphery of each ring, said flanges closely fitting together within the annular casing with their edges abutting the inward wall thereof, and the inner edge of said inward wall surrounding the sealing lip.

JOSEPH LEONARD HILLMAN.